(12) United States Patent
Kraft

(10) Patent No.: US 7,866,496 B2
(45) Date of Patent: Jan. 11, 2011

(54) LIGHTWEIGHT FINISH FOR HOT-FILL CONTAINER

(75) Inventor: Richard Kraft, Shorewood, IL (US)

(73) Assignee: Stokely-Van Camp, Inc., Chicago, IL (US)

( * ) Notice: Subject to any disclaimer, the term of this patent is extended or adjusted under 35 U.S.C. 154(b) by 725 days.

(21) Appl. No.: 11/859,520

(22) Filed: Sep. 21, 2007

(65) Prior Publication Data

US 2009/0078668 A1 Mar. 26, 2009

(51) Int. Cl.
B65D 1/02 (2006.01)
(52) U.S. Cl. .......................................... 215/44; 220/288
(58) Field of Classification Search ................... 215/40, 215/44; 220/288
See application file for complete search history.

(56) References Cited

U.S. PATENT DOCUMENTS

| | | | |
|---|---|---|---|
| 4,116,607 A | | 9/1978 | LeGrand |
| 4,342,398 A | * | 8/1982 | Chang .................. 215/373 |
| 4,618,515 A | | 10/1986 | Collette et al. |
| 4,852,752 A | | 8/1989 | Ota |
| 5,143,235 A | | 9/1992 | Repp |
| 5,431,291 A | | 7/1995 | LaBombarbe, Jr. |
| 5,449,077 A | | 9/1995 | Seidler |
| 5,678,711 A | | 10/1997 | Tobias |
| 5,772,076 A | | 6/1998 | Juk et al. |
| 5,829,613 A | * | 11/1998 | Wohlgemuth et al. ....... 215/256 |
| 6,006,930 A | | 12/1999 | Dreyer et al. |
| 6,076,688 A | | 6/2000 | Forget |
| 6,105,800 A | | 8/2000 | Czesak |
| 6,105,802 A | | 8/2000 | French et al. |
| 6,216,897 B1 | | 4/2001 | Wagner |
| 6,228,317 B1 | | 5/2001 | Smith et al. |
| 6,237,791 B1 | | 5/2001 | Beck et al. |
| 6,264,050 B1 | | 7/2001 | Darr et al. |
| 6,386,380 B1 | | 5/2002 | Clodfelter et al. |
| 6,415,935 B1 | | 7/2002 | Hins |
| 6,536,616 B2 | | 3/2003 | Sandor et al. |
| 6,561,369 B1 | | 5/2003 | Clodfelter et al. |
| 6,588,614 B2 | | 7/2003 | Neuner |
| 6,612,451 B2 | | 9/2003 | Tobias et al. |
| 6,648,157 B2 | | 11/2003 | Shai et al. |
| 6,837,390 B2 | * | 1/2005 | Lane et al. .................. 215/381 |
| 6,857,542 B1 | | 2/2005 | Mettler et al. |
| 6,907,653 B2 | | 6/2005 | Chupak |
| 6,923,334 B2 | | 8/2005 | Melrose et al. |
| 6,971,530 B2 | | 12/2005 | Darr |
| 7,036,671 B2 | | 5/2006 | Hidalgo et al. |

(Continued)

FOREIGN PATENT DOCUMENTS

EP 112879 7/1984

(Continued)

OTHER PUBLICATIONS

International Search Report mailed Sep. 29, 2008 for PCT/US2008/070139.

Primary Examiner—Sue A Weaver
(74) Attorney, Agent, or Firm—Banner & Witcoff, Ltd.

(57) ABSTRACT

A lightweight finish for a hot-fill container uses less material compared to existing hot-fill container finishes. The lightweight finish yields a cost savings while still providing adequate dimensional stability to allow the container to maintain its shape during the hot-fill process.

11 Claims, 2 Drawing Sheets

U.S. PATENT DOCUMENTS

| | | |
|---|---|---|
| 7,097,056 B2 | 8/2006 | Ozawa et al. |
| 7,097,061 B2 | 8/2006 | Simpson, Jr. et al. |
| 2002/0148800 A1* | 10/2002 | Ozawa et al. .................. 215/40 |
| 2003/0031814 A1 | 2/2003 | Hutchinson et al. |
| 2003/0222047 A1 | 12/2003 | McRae |
| 2005/0158495 A1 | 7/2005 | Nahill |
| 2005/0236356 A1 | 10/2005 | Lonsway |
| 2007/0045216 A1 | 3/2007 | Gami et al. |
| 2007/0051688 A1* | 3/2007 | Dygert et al. .................. 215/44 |

FOREIGN PATENT DOCUMENTS

| | | |
|---|---|---|
| WO | 8400346 A1 | 2/1984 |
| WO | 9938914 A2 | 8/1999 |

* cited by examiner

LIGHTWEIGHT FINISH FOR HOT-FILL CONTAINER

DESCRIPTION OF RELATED ART

Hot-fillable plastic containers have been used for various products. Such containers are designed to receive liquids that are sterilized and placed in the container while hot. Often the containers are filled while the liquid is in the temperature range of 175-185° F.

Hot-fillable polyester bottles are typically produced by a stretch blow molding process which begins with the formation of an injected molded preform. The preform is typically of a configuration similar to that of a laboratory test tube in that it has an elongated cylindrical configuration with an open end. The open end (which will form the filling and pouring aperture of the container) is injected molded to have the final configuration of the container open end. In other words, this portion is formed during the injection molding process and is not changed during the subsequent blow molding operation. It will typically have means such as external threads to accept a closure.

Subsequently, the preform body is heated to a suitable temperature although the neck area is not heated. After reaching the desired temperature, the preform is introduced into a controlled temperature blow mold. This mold is designed to give the final configuration to the body of the container.

Once located in the blow mold, a rod is introduced into the preform to stretch the preform to the bottom or base of the blow mold. High pressure air is then introduced into the preform and forces the plastic material of the preform into contact with the blow mold. The plastic cools sufficiently such that when the blow mold opens, the newly formed structure retains its shape.

The body of the container, having been biaxially oriented through the axial stretching followed by radial stretching undergoes a molecular change which transforms the structure of the preform into a semi-crystalline container wall. This transformation allows the container walls to withstand relatively high temperatures such as encountered during the filling of the container with the hot product.

While the body is capable of withstanding the temperatures of the hot product during the filling, the neck of the container has not undergone any molecular change and remains in an amorphous state. As such, the plastic will soften at its glass transition temperature which varies according to the plastic, but is well below the temperatures typically encountered during hot filling.

In order to overcome the above problem, the neck portion is usually formed to have a relatively large thickness which increases the amount of time available before the heat from the hot fill product migrates into the thread area which can cause distortion. Even with increased thickness, the amount of time is relatively short and intensive water cooling of the exterior of the container neck is necessary immediately after capping in order to minimize the thread distortion. Even a slight increase in process fill temperature or an interruption of the filling line can upset the balance and allow enough heat migration into the thread area such that failure of the neck will occur.

SUMMARY OF THE INVENTION

The present invention is directed to a lightweight finish for a hot-fill container that uses less material compared to existing hot-fill container finishes. It was found that less material can be used in the finish while still providing adequate dimensional stability to allow the container to maintain its shape during the hot-fill process. The reduction in material usage yields a cost savings, which can be substantial when manufacturing mass quantities of hot-fill containers.

In one aspect, a lightweight finish for a hot-fill container has an outer surface having an annular lower flange, an annular upper flange, and threads located above the annular upper flange. The finish usually has a weight of from about 3.5 to about 8 g.

BRIEF DESCRIPTION OF THE DRAWINGS

The objects, features, and advantages of the invention will be apparent from the following more detailed description of certain embodiments of the invention and as illustrated in the accompanying drawings in which.

DETAILED DESCRIPTION OF THE INVENTION

The lightweight finish described herein is adapted for implementation in hot-fill containers. Such containers may vary in size and shape, and by way of example may have a volume ranging from about 6 to 24 ounces, often from about 8 to 20 ounces. Specific examples include juice containers having volumes of 10 oz. and 15.2 oz. The containers often are constructed from thermoplastic polyesters, such as polyethylene terephthalate (PET) or PET-based polymeric materials. Among the considerations in developing the lightweight closure were finish stability (both ovality and perpendicularity), thread pitch to eliminate closure back-off, and finish/closure compatibility.

Figure 1:
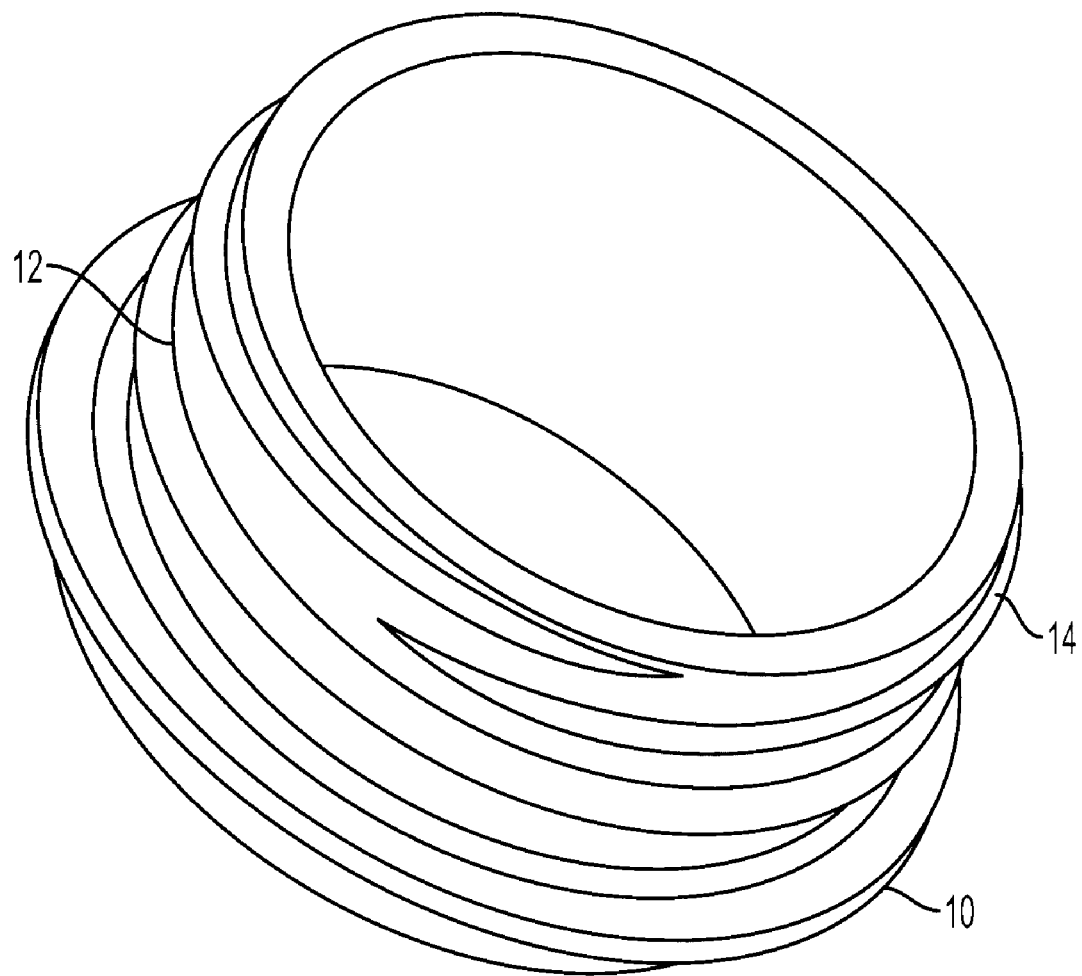
FIG. 1 shows a side elevation of a lightweight neck finish.

With reference to FIG. 1, a hot-fill container neck finish typically has an outer surface having an annular lower flange 10 and an annular upper flange 12. The outer surface also includes threads 14 located above the annular upper flange 12. The threads 14 can be configured to receive a suitable closure, such as a cap. For example, the finish may include two threads 14 that each extend about 180° around the circumference of the finish.

Figure 2:
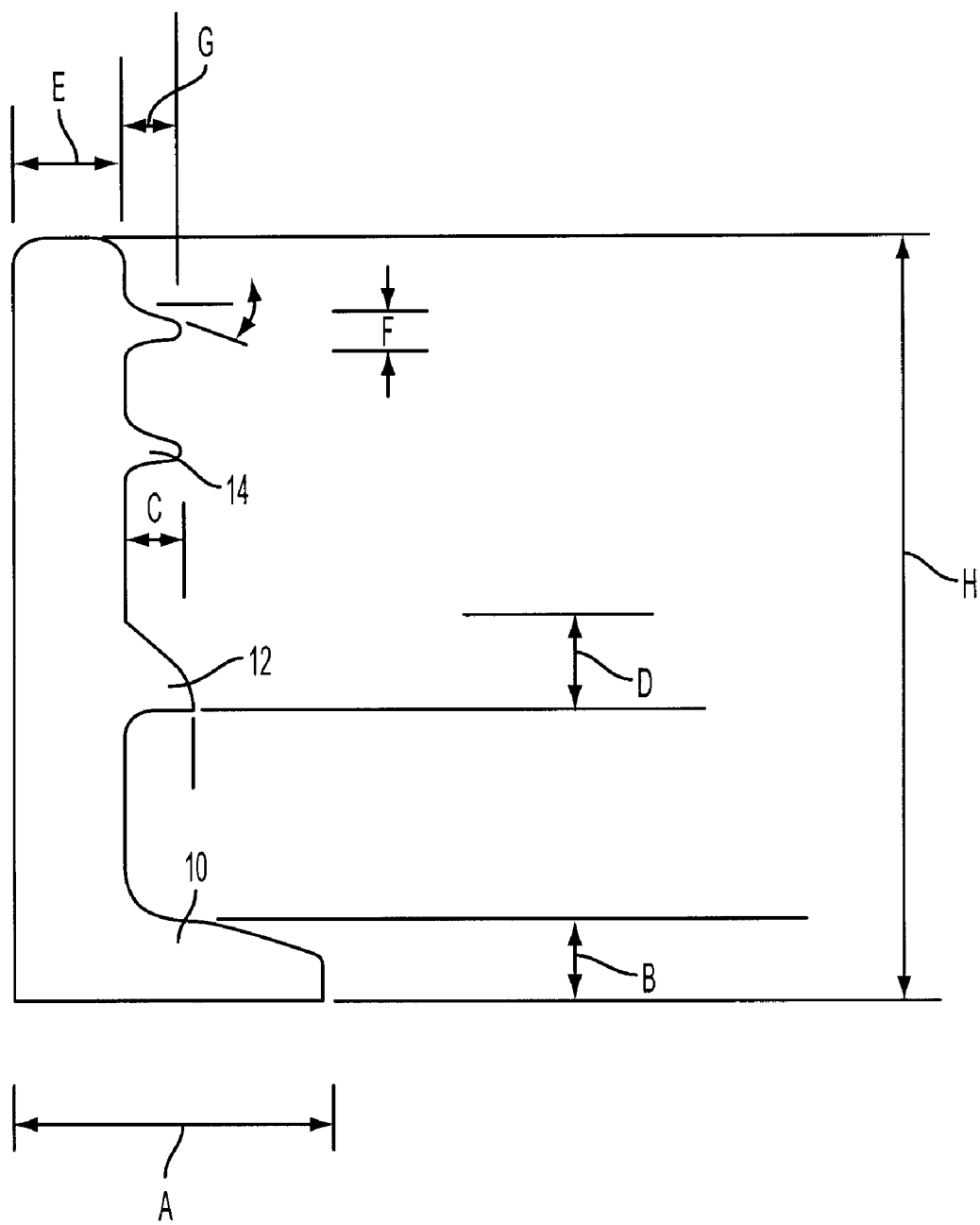
FIG. 2 shows an example of dimensions for a 43 mm neck finish having a 0.080" 'E' wall thickness.

With reference to FIG. 2, the dimensions of the finish can be selected to reduce the overall finish weight, while still permitting the finish to be usable with existing closures. If necessary, the interior portion of the closure (core design) can be modified to mate to the thread profile of the bottle design. The height "H" of the finish can be reduced relative to conventional hot-fill finishes. Typically, the height "H" ranges from about 0.6 to about 0.8 inches, often from about 0.662 to about 0.722 inches or from about 0.662 to about 0.682 inches.

FIG. 2 illustrates a 43 mm finish having a wall thickness "E" of 0.080 inches. Usually, the wall thickness "E" ranges from about 0.06 to about 0.125 inches, often from about 0.075 to about 0.095 inches. It may be desirable to select a wall thickness "E" to match existing hot-fill closures, so that existing closure shells can be used as well as existing capping parts.

The volume of the finish typically ranges from about 2.6 to about 5.9 cm$^3$, often from about 3.4 to about 5.4 cm$^3$. The weight of the finish typically ranges from about 3.5 to about 8 g, often from about 4.5 to about 7.3 g. By way of example, the volume of the finish illustrated in FIG. 2 having a wall thickness "E" of 0.080 inches is 5.152 cm$^3$, which corresponds to a weight of approximately 6.88 grams when PET is used. A corresponding finish having a wall thickness "E" of 0.100 inches yields a volume of 6.104 cm$^3$ and weight of approximately 8.16 grams.

The lower flange 10 typically has a thickness "A" from about 0.2 to about 0.25 inches, often from about 0.22 to about 0.23 inches, and a height "B" from about 0.05 to about 0.08 inches, often from about 0.065 to about 0.075 inches.

The distance "C" that the upper flange 12 projects from the outer surface of the finish typically ranges from about 0.025 to about 0.055 inches, often from about 0.035 to about 0.045 inches. The upper flange 12 typically has a height "D" ranging from about 0.06 to about 0.1 inches, often from about 0.075 to about 0.085 inches.

The distance "G" that the threads 14 project from the outer surface of the finish typically ranges from about 0.025 to about 0.055 inches, often from about 0.035 to about 0.045 inches. The threads 14 typically have a height "F" of from about 0.04 to about 0.08 inches, often from about 0.055 to about 0.065 inches.

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. A lightweight finish for a hot-fill container comprising an outer surface having an annular lower flange, an annular upper flange, and threads located above the annular upper flange, wherein the finish has a weight of from about 3.5 to about 8 g, and wherein the annular lower flange has a thickness "A" of from about 0.2 to about 0.25 inches, and a height "B" of from about 0.05 to about 0.08 inches.

2. The lightweight finish of claim 1, wherein the finish has a weight of from about 4.5 to about 7.3 g.

3. The lightweight finish of claim 1, wherein the thickness "A" is from about 0.22 to about 0.23 inches, and the height "B" is from about 0.065 to about 0.075 inches.

4. A lightweight finish, for a hot-fill container comprising an outer surface having an annular lower flange, an annular upper flange, and threads located above the annular upper flange, wherein the finish has a weight of from about 3.5 to about 8 g, wherein the annular upper flange projects from the outer surface of the finish at a distance "C" of from about 0.025 to about 0.055 inches, and has a height "D" of from about 0.06 to about 0.1 inches.

5. The lightweight finish of claim 4, wherein the distance "C" is from about 0.035 to about 0.045 inches, and the height "D" is from about 0.075 to about 0.085 inches.

6. A lightweight finish, for a hot-fill container comprising an outer surface having an annular lower flange, an annular upper flange, and threads located above the annular upper flange, wherein the finish has a weight of from about 3.5 to about 8 g, wherein each of the threads projects from the outer surface of the finish at a distance "G" of from about 0.025 to about 0.055 inches, and has a height "F" of from about 0.04 to about 0.08 inches.

7. The lightweight finish of claim 6, wherein the distance "G" is from about 0.035 to about 0.045 inches, and the height "F" is from about 0.055 to about 0.065 inches.

8. A lightweight finish for a hot-fill container comprising:
an outer surface having an annular lower flange having a thickness "A" of from about 0.2 to about 0.25 inches, and a height "B" of from about 0.05 to about 0.08 inches;
an annular upper flange which projects from the outer surface of the finish at a distance "C" of from about 0.025 to about 0.055 inches, wherein the annular upper flange has a height "D" of from about 0.06 to about 0.1 inches; and
threads located above the annular upper flange, wherein each of the threads projects from the outer surface of the finish at a distance "G" of from about 0.025 to about 0.055 inches, and has a height "F" of from about 0.04 to about 0.08 inches.

9. The lightweight finish of claim 8, wherein the finish is constructed from polyethylene terephthalate.

10. The lightweight finish of claim 9, wherein the finish has a weight of from about 3.5 to about 8 g.

11. The lightweight finish of claim 10, wherein the finish has a weight of from about 4.5 to about 7.3 g.

* * * * *